Feb. 11, 1964 M. L. BLEDSOE 3,120,873
PLOW MOUNTING CONNECTION
Filed Feb. 9, 1961
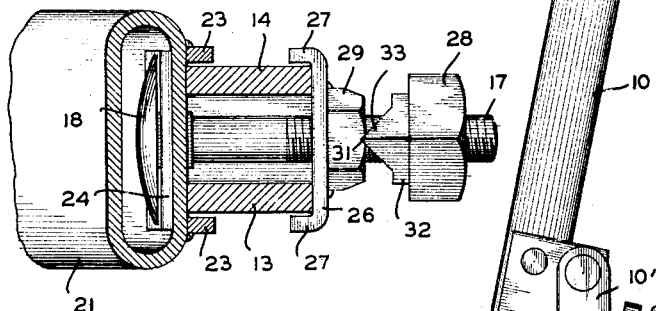
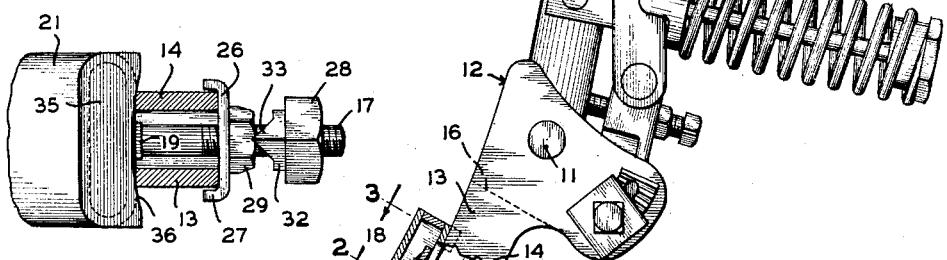
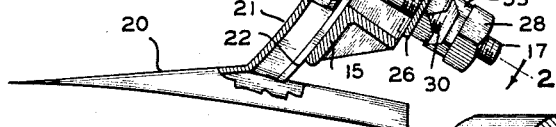
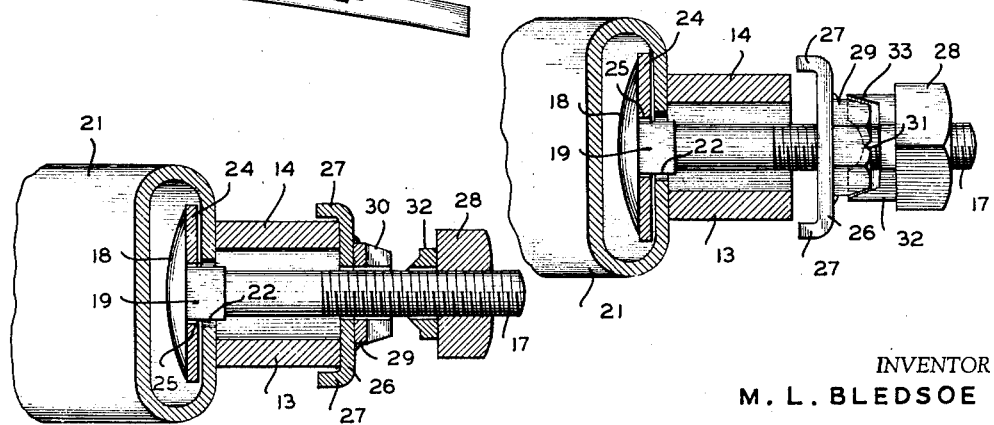
INVENTOR
M. L. BLEDSOE
BY
ATTORNEY

United States Patent Office 3,120,873
Patented Feb. 11, 1964

3,120,873
PLOW MOUNTING CONNECTION
Martin L. Bledsoe, Rte. 2, St. Pauls, N.C.
Filed Feb. 9, 1961, Ser. No. 88,207
2 Claims. (Cl. 172—751)

This invention relates to agriculture and to implements and equipment utilized in the plowing and cultivation of the soil including those of wide applicability with regard to texture and moisture content of the soil.

The invention relates particularly to plow construction and use to the manner of attaching selective plow points or earth contacting elements to the standards to which they are applied and along which they are adjusted.

Heretofore one or more bolts and nuts or other fasteners have been utilized for attaching plow points to the standards on which they were mounted with the bolts located in receiving openings and the heads of the bolts exposed and requiring the complete removal of the nuts from the bolts and the bolts in the process of attaching a plow point to its supporting standard or adjusting the same relative thereto.

It is an object of the invention to provide a connection for attaching a plow point solidly to a standard simply and inexpensively but allowing the same to be removed and replaced in a minimum of time and with a minimum of effort and which connection will protect the attaching means from abrasive contact with the earth and consequent wear.

A further object of the invention is to provide a connection for attaching a plow to a connector and having fixed and movable interfitting spacers held together by a single bolt and nut and which permits much greater movement than the mere unscrewing of a lock nut, and which contains relatively few parts and is easily and quickly adjustable for depth.

Other objects and advantages of the invention will be apparent from the following description taken in conjunction with the accompanying drawing whrein:

FIG. 1 is a side elevation with portions broken away and illustrating one application of the invention;

FIG. 2, an enlarged section on the line 2—2 of FIG. 1;

FIG. 3, an enlarged section on the line 3—3 of FIG. 1;

FIG. 4, a section similar to FIG. 3 showing the device in expanded condition, and FIG. 5, a section similar to FIG. 3, on a reduced scale and illustrating a modified form of the invention.

Briefly stated, the invention is concerned with simple and inexpensive means for solidly connecting a plow to a conventional standard in a manner that it can be quickly and easily applied, removed, adjusted for depth, and which connection employs a fixed spacer and a movable spacer fastened together by a single bolt for positively attaching the plow to the standard, with the head of the bolt protected, and with the fixed and movable collars having interfitting notched portions, the fixed spacer having a shallow notch with spaced aligned portions and a deep notch adapted to selectively receive a projection of the movable spacer to permit axial movement of the fixed spacer upon rotation of the movable spacer, and without build up of earth on the shank of the plow.

With continued reference to the drawing, a plow standard 10 is connected by a pivot bolt 11 to a plow point connector 12 near its lower end portion. The plow point connector has spaced side members 13 and 14 with a lower or end connection 15 and an intermediate connection 16, the spacing of the side members providing a slot therebetween.

In order that the plow point connector 12 may yield when the plow point strikes a boulder or obstruction of sufficient size, the plow point connector 12 is provided with a conventional spring loaded over-center toggle 10' including a spring 10''.

The side members 13 and 14 and the connections 15 and 16 define a space or slot in which a connecting member, such as a bolt 17 having an enlarged head 18 and a square shank 19, is located. A plow point or sweep 20 is adapted to be mounted on the plow point connector 12 by the bolt 17.

In order to maintain the sweep in fixed position and to provide for easy adjustment and removal thereof, the shank portion 21 of the plow point or sweep is generally oval in configuration and is provided along its rear with an elongated slot 22 substantially the full length of the shank. The upper end of the shank has a rearwardly extending lug 23 on each side which projects rearwardly and exteriorly of the side members 13 and 14 to prevent the shank from twisting when attached.

In order to attach the sweep to the connector 12, the bolt 17 preferably is provided with a washer 24 which engages the head 18 of the bolt and such washer has a polygonal opening 25 in which the similar polygonal shank portion 19 of the bolt is received to prevent relative rotation between the bolt and the washer.

The opposite end of the bolt 17 is secured to the connector 12 by a yoke 26 which spans the gap between and extends across the side members 13 and is provided with downwardly turned flanges 27 which prevent rotation of such yoke relative to said side members.

To quickly release the plow point or sweep from the connector without disassembling the bolt 17 from its lock nut 28, the yoke 26 is provided with a fixed spacer 29 having a relatively deep groove 30 in one direction and a second shallower groove or notch 31 substantially at right angles to the first groove.

A movable spacer 32 is provided intermediate the spacer 29 and the lock nut 28 and has a projection 33 of a configuration to fit and be received in the groove 30 or the notch 31.

When the shank 21 of the plow point or the like is fastened to the connector 12 and the nut 28 tightened, the movable spacer 32 is positioned so that the projection 33 is located in the notch 31 and when it is desired to loosen the connection, it only is necessary to loosen the nut 28 a sufficient amount to withdraw the spacer 32 from the notch 31 and a rotate such spacer approximately 90 degrees so that the projection 33 is substantially in alignment with the groove 30 whereupon the yoke 26 may be moved axially of the bolt and the tension on the bolt head is relieved so that the sweep 20 can be adjusted upwardly or downwardly along the shank or removed completely by sliding such sweep upwardly until the bolt 17 is no longer located within the slot 22.

Instead of the rearwardly extending lugs 23 the shank portion 21 may be prevented from twisting by providing such shank portion with an end plate 35 across its upper end as illustrated in FIG. 5. The end plate has an arcuate rear surface 36 adapted to engage the side members 13 and 14 of the plow point connector so that when the bolt 17 is tightened the sides 13 and 14 which bear against the arcuate surface 36 will automatically cam the shank portion into alignment and prevent twisting of such shank portion as long as the bolt is under tension.

It will be apparent that when the sweep has been moved to any adjusted position the procedure is reversed rapidly to secure the sweep in the adjusted position. By enclosing the bolt head within the hollow shank, the head is not subjected to the abrasive action of the earth and does not form an obstacle for the build-up of earth as the implement is drawn through the earth.

It will be understood from the foregoing that a plow mounting connection is provided which is simple, of low cost, increased strength, can be quickly applied, adjusted or removed, in which the head of the locking bolt is protected from direct contact and wear by the earth engaged by the plow. Also it will be apparent that the structure is of a character to minimize accumulation of excess soil thereon, that the parts can be readily assembled, taken apart or adjusted without the necessity of removing nuts, washers and the like, and that a positive connection is provided with fewer bolts or fasteners.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A plow construction comprising a standard, a plow point having a hollow shank extending upwardly therefrom with a slot disposed centrally along the rear thereof, a connector secured to said standard having an upright slot through the same from front to rear, a single bolt passing through the slot in said hollow shank and the slot in said connector, said bolt having a head within said hollow shank and a nut on its opposite end for adjustably mounting the plow point against the connector, said hollow shank being provided with lug means extending rearwardly into engagement with said connector to prevent said shank from twisting relative to said connector, a pair of cooperating expansible spacers encircling the bolt in normally expanded position between the nut and the rear side of the connector, said spacers being rotatably collapsible when the nut is slightly loosened whereby to leave a greater space between the nut and the connector for quick and easy adjustment of the plow point along the connector, said single bolt and said lug means constituting the sole means for mounting the plow point on the connector.

2. A plow construction comprising a standard, a plow point having a hollow shank extending upwardly therefrom with a slot disposed along the rear thereof, a connector secured to said standard having an upright slot through the same from front to rear, a single bolt means passing through the slot in said hollow shank and the slot in said connector, said bolt means having a head within said hollow shank and force applying means on its opposite end for adjustably mounting the plow point relative to the connector, said hollow shank having lug means extending rearwardly into engagement with said connector to prevent said shank from twisting relative to said connector, collapsible spacer means encircling the bolt between the force applying means and the rear side of the connector, said spacer means being rotatably collapsible when the force applying means is loosened slightly, said single bolt means and said lug means constituting the sole means for mounting the plow point on the connector.

References Cited in the file of this patent

UNITED STATES PATENTS

| | | |
|---|---|---|
| 260,720 | Weymouth | July 4, 1882 |
| 789,399 | Westervelt | May 9, 1905 |
| 917,603 | Hench | Apr. 6, 1909 |
| 1,435,433 | Triggs | Nov. 14, 1922 |
| 1,499,531 | Hoeregott | July 1, 1924 |
| 1,579,102 | Gale | Mar. 30, 1926 |
| 1,838,355 | Benjamin | Dec. 29, 1931 |
| 2,109,385 | Garrison | Feb. 22, 1938 |